United States Patent
Lee et al.

(10) Patent No.: US 9,348,471 B2
(45) Date of Patent: May 24, 2016

(54) METHOD AND APPARATUS FOR IMPROVING TOUCH SENSITIVITY OF TOUCH SCREEN PANEL

(71) Applicant: Samsung Electronics Co., Ltd., Suwon-si, Gyeonggi-so (KR)

(72) Inventors: Heonseok Lee, Suwon-si (KR); Jongdae Park, Suwon-si (KR); Hoondo Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 13/667,522

(22) Filed: Nov. 2, 2012

(65) Prior Publication Data

US 2013/0113753 A1 May 9, 2013

(30) Foreign Application Priority Data

Nov. 9, 2011 (KR) .................. 10-2011-0116399

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ....... G06F 3/044; G06F 3/041; G06F 3/0416; G06F 3/0488; G06K 9/0002
USPC ..................... 345/173–178; 178/18.01–20.03
See application file for complete search history.

(56) References Cited

U.S. PATENT DOCUMENTS

| | | | | |
|---|---|---|---|---|
| 3,732,369 A | * | 5/1973 | Cotter | 178/20.04 |
| 4,698,461 A | * | 10/1987 | Meadows et al. | 345/174 |
| 8,076,949 B1 | * | 12/2011 | Best | G06F 3/044 |
| | | | | 324/663 |
| 2009/0066665 A1 | * | 3/2009 | Lee | 345/173 |
| 2009/0160787 A1 | | 6/2009 | Westerman et al. | |
| 2009/0273579 A1 | * | 11/2009 | Zachut et al. | 345/174 |
| 2010/0053095 A1 | | 3/2010 | Wu et al. | |
| 2010/0060608 A1 | | 3/2010 | Yousefpor | |
| 2010/0200310 A1 | | 8/2010 | Yeh et al. | |
| 2010/0289769 A1 | | 11/2010 | Watanabe | |
| 2011/0006832 A1 | | 1/2011 | Land et al. | |
| 2011/0012840 A1 | | 1/2011 | Hotelling et al. | |

(Continued)

FOREIGN PATENT DOCUMENTS

DE 20 2012 103 232 U1 9/2012
EP 2 159 670 A2 3/2010

(Continued)

*Primary Examiner* — Kathy Wang-Hurst
*Assistant Examiner* — Matthew Yeung
(74) *Attorney, Agent, or Firm* — Jefferson IP Law, LLP (57) ABSTRACT

A method and an apparatus for improving touch sensitivity of a capacitive type touch screen panel are provided. In the method, the apparatus sequentially drives a plurality of transmitting channels of the touch screen panel using a predetermined scan frequency. The apparatus determines a sequential touch count by simultaneously scanning a plurality of receiving channels of the touch screen panel wherein the sequential touch count is the number of sequentially touched receiving channels. Also, the apparatus specifies a scan unit to be used for dividing the plurality of receiving channels into groups on the basis of the sequential touch count and for sequentially scanning the groups of the receiving channels. The apparatus determines a touch coordinate by sequentially scanning the plurality of receiving channels using the specified scan unit.

15 Claims, 11 Drawing Sheets

(56) References Cited

U.S. PATENT DOCUMENTS

| | | |
|---|---|---|
| 2011/0074725 A1 | 3/2011 | Westerman et al. |
| 2011/0100727 A1 | 5/2011 | Choi et al. |
| 2011/0242025 A1* | 10/2011 | Wen et al. ............... 345/173 |
| 2011/0242048 A1* | 10/2011 | Guedon et al. ........... 345/174 |
| 2011/0248950 A1* | 10/2011 | Yang et al. ............... 345/174 |
| 2012/0242612 A1* | 9/2012 | Chang ...................... 345/174 |
| 2013/0162583 A1 | 6/2013 | Simmons et al. |

FOREIGN PATENT DOCUMENTS

| | | |
|---|---|---|
| EP | 2 275 907 A2 | 1/2011 |
| EP | 2 278 445 A2 | 1/2011 |
| EP | 2 317 420 A1 | 5/2011 |
| JP | 2010-267093 A | 11/2010 |

* cited by examiner

METHOD AND APPARATUS FOR IMPROVING TOUCH SENSITIVITY OF TOUCH SCREEN PANEL

PRIORITY

This application claims the benefit under 35 U.S.C. §119 (a) of a Korean patent application filed on Nov. 9, 2011 in the Korean Intellectual Property Office and assigned Serial No. 10-2011-0116399, the entire disclosure of which is hereby incorporated by reference.

BACKGROUND OF THE INVENTION

1. Field of the Invention

The present invention relates to a method and apparatus for improving touch sensitivity of a touch screen. More particularly, the present invention relates to a method and apparatus for improving touch sensitivity of a capacitive type touch screen panel.

2. Description of the Related Art

There has been a recent trend of electronic devices with various input devices. More specifically, many recent electronic devices have a touch screen panel integrated with a display unit. When a user's finger is in contact with the surface of a capacitive touch screen panel, the capacitance is varied at a touched point, and an electronic signal is created depending on the variation of capacitance. When the level of the electronic signal exceeds a predetermined threshold value, a control unit of the electronic device having the touch screen panel determines that a touch event occurs, determines location information at a point where the touch event occurs, and performs related functions based on the determined location information.

However, there arises a problem that touch sensitivity may be reduced in the control unit of the electronic device with the touch screen panel. More particularly, when any touch happens in a free-space state, an unfavorable phenomenon occurs in which touch sensitivity (namely, the level of an electronic signal) is reduced. Here, a free-space state denotes a state in which the user does not hold the electronic device. For example, when the user is driving, the user may touch a screen without holding the electronic device because the electronic device is supported by a holder equipped in the vehicle. Unfortunately, due to such reduction of touch sensitivity, the control unit may fail to recognize a touch event or may recognize it only after a time delay.

SUMMARY OF THE INVENTION

Aspects of the present invention are to address at least the above-mentioned problems and/or disadvantages and to provide at least the advantages described below. Accordingly, an aspect of the present invention is to provide a method and apparatus for improving touch sensitivity.

Another aspect of the present invention is to provide a method and apparatus for improving touch sensitivity of a touch screen panel with respect to a touch occurring in a free-space state.

In accordance with an aspect of the present invention, a method for improving touch sensitivity in an electronic device having a capacitive type touch screen panel is provided. The method includes sequentially driving a plurality of transmitting channels of the touch screen panel using a predetermined scan frequency, determining a sequential touch count by simultaneously scanning a plurality of receiving channels of the touch screen panel wherein the sequential touch count is the number of sequentially touched receiving channels, specifying a scan unit to be used for dividing the plurality of receiving channels into groups on the basis of the sequential touch count and for sequentially scanning the groups of the receiving channels, and determining a touch coordinate by sequentially scanning the plurality of receiving channels using the specified scan unit.

In accordance with another aspect of the present invention, an apparatus for improving touch sensitivity is provided. The apparatus includes a capacitive type touch screen panel having a plurality of transmitting and receiving channels, and a control unit configured to sequentially drive the plurality of transmitting channels using a predetermined scan frequency, to determine a sequential touch count by simultaneously scanning the plurality of receiving channels wherein the sequential touch count is the number of sequentially touched receiving channels, to specify a scan unit on the basis of the sequential touch count, and to determine a touch coordinate by sequentially scanning the plurality of receiving channels using the specified scan unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1A:
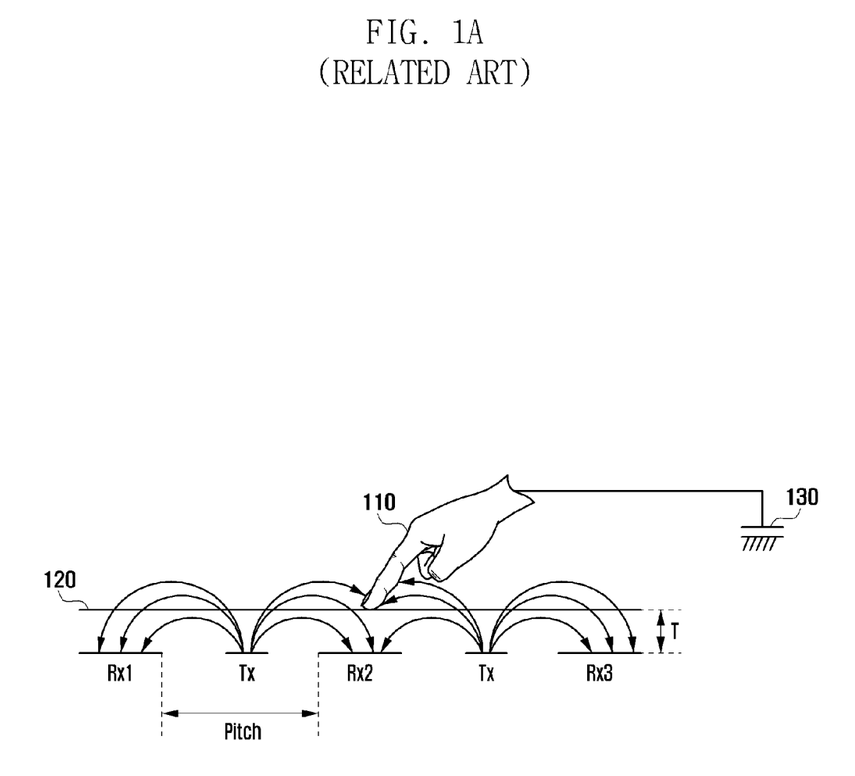
FIGS. 1A to 1C are views illustrating touch sensitivity characteristics of an electronic device in a hands-on state and a hands-off state according to the related art.
Figure 1B:
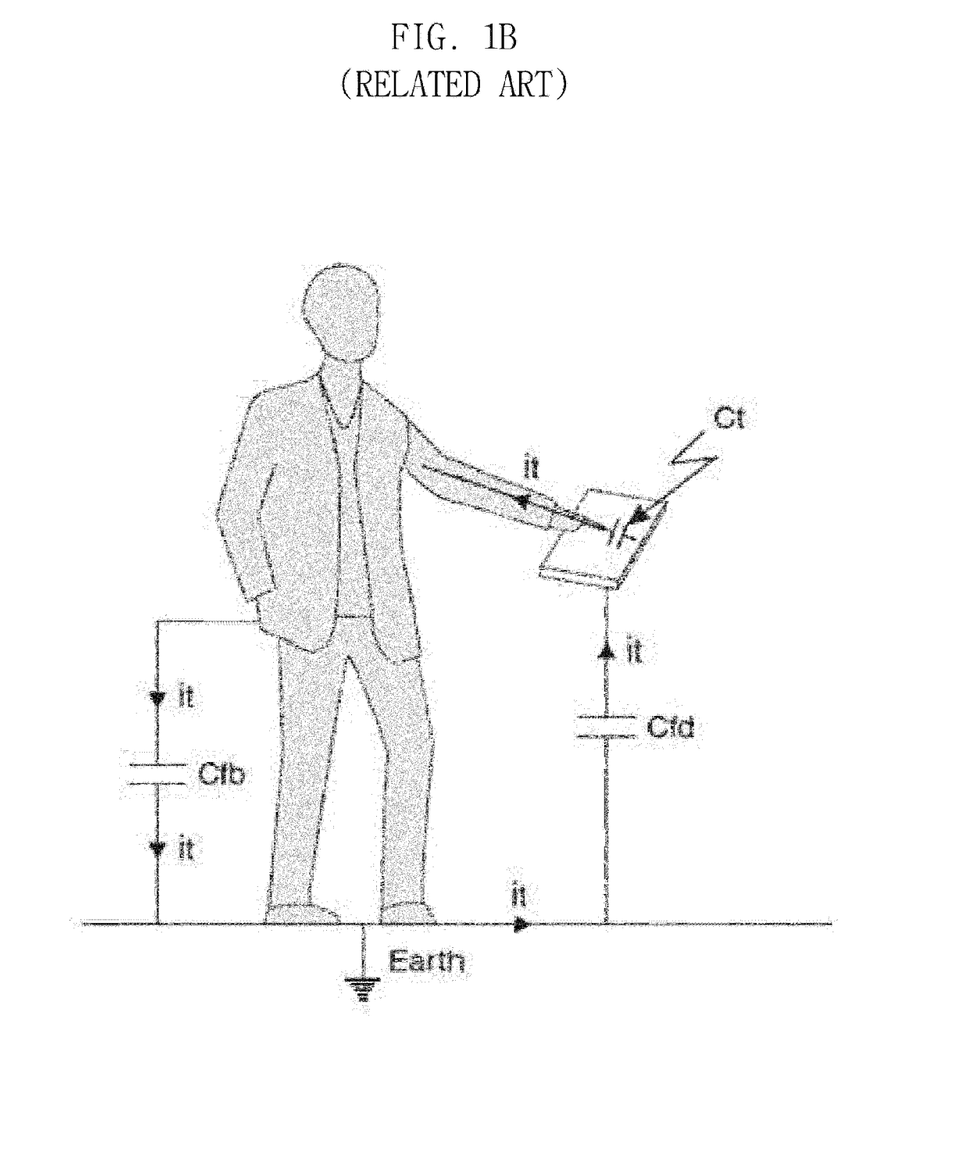
Figure 1C:
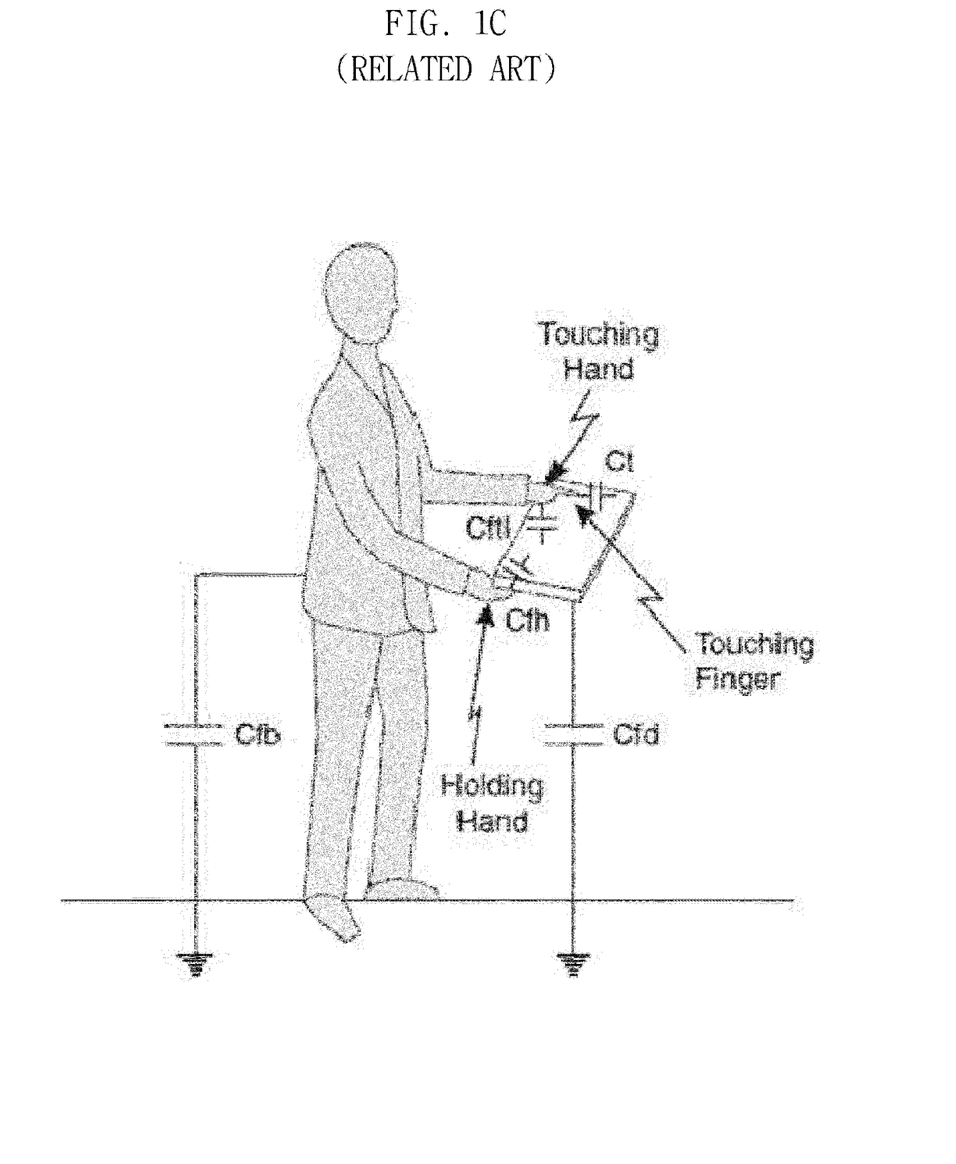

FIGS. 1A to 1C are views illustrating touch sensitivity characteristics of an electronic device in a hands-on state and a hands-off state according to the related art. Namely, FIGS. 1A to 1C show a reduction effect of touch sensitivity in a capacitive type touch screen panel.

Referring to FIGS. 1A to 1C, reference numeral 110 represents a finger of the user, reference numeral 120 represents a surface of the touch screen panel which is in contact with the finger 110, reference numeral 130 represents a capacitance accumulated between the user's body and a ground, Tx represents a transmitting channel for outputting a transmitting signal (Tx signal) to the touch screen panel, and Rx1, Rx2 and Rx3 respectively represent three receiving channels for outputting a received signal (Rx signal) to a control unit.

Referring to FIG. 1A, a capacitance is formed between the transmitting channel (Tx) and each of the receiving channels (Rx1, Rx2 and Rx3). When the finger 110 is in contact with the surface 120, a part of the electric flux outputted from the transmitting channel (Tx) is inputted into the finger 110 connected to a ground. Accordingly, the capacitance between a transmitting channel (Tx) and a receiving channel (Rx) is varied, and an electric current of a received signal inputted into the control unit is also varied. The control unit converts an analog-type received signal inputted from the receiving channel (Rx) into digital data, and determines a touch position based on the digital data. Here, the ground connected to the finger 110 may be an electronic device (namely, any ground formed in the electronic device) or the earth ground. More specifically, the earth ground is considered as the ground connected to the finger 110 in case of a free-space state, and any electronic device is considered as the ground connected to the finger 110 when the user holds the electronic device. Charges accumulated at the user's body are quickly discharged when the electronic device is the ground. However, when the earth surface is the ground, charges are accumulated at the user's body for a long time. Therefore, there is an issue that the electric flux may not be inputted into the finger 110 when the earth surface is the ground. Furthermore, there is an issue that the electric flux is inputted into any adjacent receiving channel not a specific receiving channel actually touched by the user. Unfortunately, these may invite reductions in touch sensitivity such as non-touch, screen trembling, and the like.

In case of a free-space state as shown in FIG. 1B, a closed loop is formed between an electronic device and the earth ground through a human body. If the user makes a touch action in this free-space state, charges may not flow directly to the earth's surface but may instead remain in the human body. Moreover, such charges may return to the touch screen panel through the finger. Therefore, the touch sensitivity is reduced and the touch is not recognized. If any touch occurs on a large area, this touch may affect adjacent receiving channels, thereby further reducing touch sensitivity.

On the other hand, when the user makes a touch action in a hands-on state (namely, while holding an electronic device), a small closed loop is formed through the user's arms as shown in FIG. 1C. Charges transferred to a finger through this closed loop directly flow to the ground of the electronic device. For this reason, the above-mentioned problems do not happen. As discussed above, if an area over a pitch is touched in a free-space state, touch sensitivity becomes reduced by charges flowing between different channels. So, in a free-state state, any surface touch using touch size information may not be properly operated.

In order to address a reduction in touch sensitivity, an approach of amplifying a gain of a received signal or increasing a threshold value may be considered. However, this approach may cause a problem in that a noise effect is also amplified. Another approach of increasing a thickness between the surface 120 and a channel plane of the touch screen panel may be considered. Although this approach is effective in improving touch sensitivity, it may become an obstacle to obtaining a small size of a smart phone or a tablet Personal Computer (PC). In order to minimize interference between adjacent receiving channels, an approach of increasing a pitch between the receiving channels may be considered. This approach may, however, have a problem in that touch sensitivity is reduced in case of a touch on a small area. Accordingly, a new approach to improve touch sensitivity while reducing a thickness T without amplifying a gain of a received signal, without artificially increasing a threshold value, and without artificially increasing a pitch is required.

Figure 2:
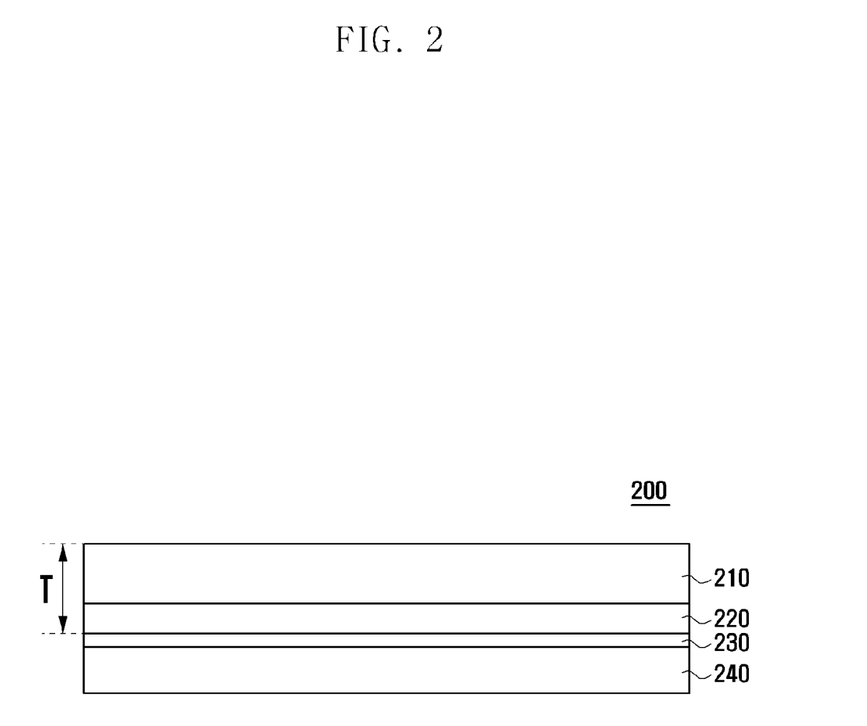
FIG. 2 is a cross-sectional view illustrating a capacitive type touch screen panel according to an exemplary embodiment of the present invention.

FIG. 2 is a cross-sectional view illustrating a capacitive type touch screen panel according to an exemplary embodiment of the present invention.

Referring to FIG. 2, a touch screen panel 200 may include a cover window 210, an adhesive sheet 220, a sensor sheet 230, and a substrate 240. The above-mentioned thickness T may be defined as an interval between the upper surfaces of the cover window 210 and sensor sheet 230 as shown in FIG. 2.

In FIG. 2, the cover window 210 is exposed to the outside of the electronic device. During operation, a surface of the cover window 210 may be in contact with a touch input tool such as a finger. The cover window 210 allows light generated in the electronic device to be delivered to the outside. This cover window 210 may be formed of Polymethyl Methacrylate (PMMA), Polycarbonate (PC), glass, or any equivalent.

The adhesive sheet 220 is interposed between the cover window 210 and the sensor sheet 230. The adhesive sheet 220 allows the sensor sheet 230 to be firmly disposed on a lower surface of the cover window 210 and allows light generated in the electronic device to be delivered to the cover window 210. For this, the adhesive sheet 220 may be formed of Optical Clear Adhesive (OPA), Super View Resin (SVR), or any equivalent.

The sensor sheet 230 is disposed on the lower surface of the cover window 210 through the adhesive sheet 220. The sensor sheet 230 generates an electrical signal according to a touch of the touch input tool with respect to the cover window 210 and delivers the signal to the control unit. For this, the sensor sheet 230 has a selected number (M) of transmitting channels (Tx) and a selected number (N) of receiving channels (Rx). The M transmitting channels (Tx) and the N receiving channels may be arranged in a matrix form. An intersection of the x-th transmitting channel and the y-th receiving channel is defined as a sensing node. This sensing node may be represented by x and y coordinates. That is, the sensor sheet 230 includes "M*N" number of sensing nodes. Also, the sensor sheet 230 transmits light generated in the electronic device to the adhesive sheet 220. For this, the sensor sheet 230 may be formed of any transparent conductive layer, for example, Indium Tin Oxide (ITO). The sensor sheet 230 may be deposited on the upper surface of the substrate 240.

The substrate 240 transmits light generated in the electronic device to the sensor sheet 230. For this, the substrate 240 may be formed of glass or any equivalent. In an exemplary implementation, a noise shield sheet may be formed on a lower surface of the substrate 240. The noise shield sheet performs a function to prevent the inflow of a noise created in the electronic device (e.g., at a display unit) into the transmitting channel (Tx) and receiving channel (Rx) of the sensor sheet 230. Alternatively, the transmitting channel (Tx) may be formed on the lower surface of the substrate 240 instead of the noise shield sheet. That is, the transmitting channel (Tx) formed on the lower surface of the substrate 240 may perform a function to prevent a noise as well as an inherent function to output a transmitting signal (Tx signal).

A method and apparatus for improving touch sensitivity in accordance with exemplary embodiments of the present invention may be applied to various types of electronic devices having a capacitive type touch screen panel as discussed above. More particularly, the exemplary touch sensitivity improvement method and apparatus according to this invention may be favorably applied to mobile devices based on handheld portability, which include mobile communication devices, multimedia players and their application equipment, especially including many mobile communication terminals based on various communication protocols, a digital broadcasting player, a Personal Digital Assistant (PDA), a smart phone, a tablet PC, and the like.

Figure 3:
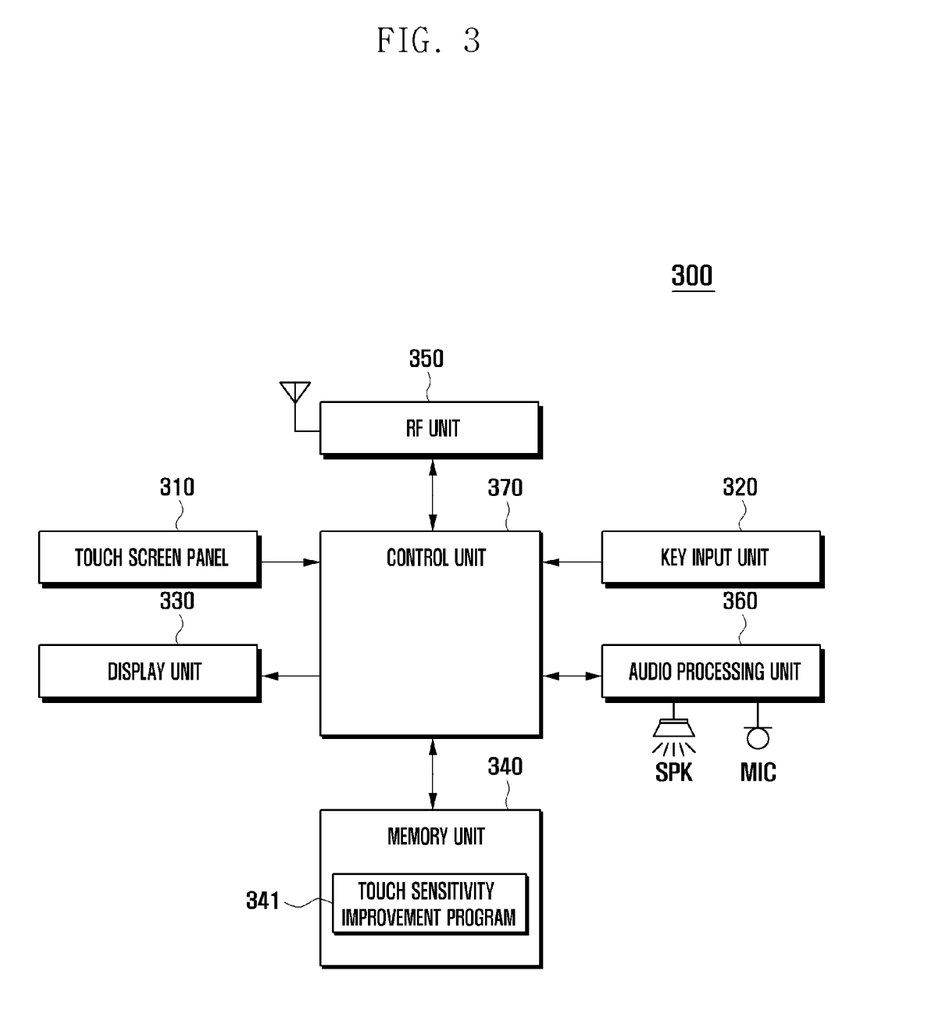
FIG. 3 is a block diagram illustrating a configuration of a mobile device according to an exemplary embodiment of the present invention.

FIG. 3 is a block diagram illustrating a configuration of a mobile device according to an exemplary embodiment of the present invention.

Referring to FIG. 3, the mobile device 300 may include a touch screen panel 310, a key input unit 320, a display unit 330, a memory unit 340, a Radio Frequency (RF) unit 350, an audio processing unit 360, a speaker (SPK), a microphone (MIC), and a control unit 370.

The touch screen panel 310, disposed on the front side of the display unit 330, generates a touch event in response to a user's manipulation on the touch screen panel 310 and delivers it to the control unit 370. The control unit 370 recognizes the touch event and may control any of the above elements in response to the touch event. The user's manipulation may be a touch, a tap, a double tap, a press, a drag, a drag-and-drop, a sweep, and so forth. A touch refers to an action of pressing any point on the screen. A tap refers to an action of touching any point on the screen and then releasing (namely, drop) a finger from the touch point without moving the finger. A double tap refers to an action of tapping any point on the screen twice. A press refers to an action of touching any point on the screen relatively longer than a tap and then releasing a finger from the touch point without moving the finger. A drag refers to an action of moving a finger in an arbitrary direction while maintaining a touch on the screen. A drag-and-drop refers to an action of dragging and then releasing a finger from the screen. A sweep refers to an action of quickly moving and releasing a finger like flipping. A drag may be referred to as a scroll, and a sweep may be referred to as a flick. The control unit 370 may distinguish a sweep and a drag, depending on a speed of these actions.

The key input unit 320 includes a plurality of input keys and function keys to receive the user's input actions and to set up various functions. The function keys may include navigation keys, side keys, shortcut keys, and any other special keys defined to perform particular functions. Additionally, the key input unit 320 receives the user's key manipulations for controlling the mobile device 300, creates corresponding key input signals, and delivers them to the control unit 370. Such key input signals may include power on/off signals, volume regulating signals, screen on/off signals, and the like. In response to the key input signals, the control unit 370 controls the above elements. The key input unit 320 may be embodied with a mechanical keypad such as a QWERTY keypad, a 3*4 keypad, a 4*3 keypad, or any other key arrangement. When the mobile device 300 supports the touch screen panel 310 in the form of a full touch screen, the key input unit 320 may have only side keys formed on one or more sides of a device body without any key buttons or mechanical keypad.

The display unit 330 converts image data, received from the control unit 370, into analog signals and displays them. Namely, the display unit 330 may provide various screens such as a lock screen, a home screen, an application executing screen, a menu screen, a message writing screen, an internet browser screen, a soft keypad screen, and the like. The lock screen may be provided when the display unit 330 is activated. If a particular touch event for unlock is detected, the control unit 370 may change the lock screen into the home screen or the application executing screen. The home screen may contain a plurality of icons corresponding to various applications. When one of the icons is selected by a user, the control unit 370 may execute a corresponding application and change any current screen into the application executing screen. Also, the display unit 330 may divide the screen into two or more regions under the control of the control unit 370 and use the divided regions as different screens. The display unit 330 may be formed of a Liquid Crystal Display (LCD), Organic Light Emitting Diodes (OLEDs), an Active Matrix OLED (AMOLED), or any other equivalent. The display unit 330 may display a left-eye image and a right-eye image and include a 3D implementation unit for providing a user the ability to feel depth with respect to the left-eye and right-eye images. As is well known in the art, 3D implementation technique is classified into a glass type and a glass-free type. Typical examples of the glass type are a color filter type, a polarizing filer type, and a shutter glass type. Typical examples of the glass-free type are a lenticular lens type and a parallax barrier type.

The memory unit 340 may store various data including an Operating System (OS) of the mobile device and various applications. The memory unit 340 may include a program region and a data region.

The data region of the memory unit 340 may store data created or received while the mobile device 300 is used. And, the data region may store the above-mentioned screens displayed on the display unit 330. The soft keypad screen and the menu screen among these screens may have various forms. For instance, the keypad screen may be in 3*4 or QWERTY form. Also, the menu screen may include a screen switch key for switching a screen (e.g., a return key for returning to a previous screen) and a control key for controlling an application in use. The soft keypad screen and the menu screen may be overlapped with the lock screen, the application executing screen, the home screen, and so forth. The data region may temporarily store data copied from messages, photos, web pages, documents, and the like by a user for pasting. Additionally, the data region may store various setup values (e.g., screen brightness, whether a vibration is activated or not in case of touch, whether a screen is rotated automatically, and the like) for operations of the mobile device.

The program region of the memory unit 340 may store an OS for booting and operating the mobile device, and various applications required for performing various user functions, such as a web browser for access to the Internet, a sound output application, an image viewer application, a video player application, or the like. More particularly, the program region may contain a specific program 341 for improving touch sensitivity. This program 341 may have a routine for detecting the number of receiving channels through an entire scan of the receiving channels, a routine for determining, based on the detected number, whether a touch occurs, and a routine for determining touch coordinates through a re-scan for each receiving channel. Also, this program 341 may further have a routine for specifying a scan frequency for the re-scan.

The RF unit 350 performs a voice call, a video call, or a data communication under the control of the control unit 370. For this, the RF unit 350 may include an RF transmitter that up-converts the frequency of an outgoing signal and amplifies the signal, and an RF receiver that amplifies with low-noise an incoming signal and down-converts the frequency of the signal. Also, the RF unit 350 may include a mobile communication module (e.g., a 3rd generation mobile communication module or a 4th generation mobile communication module, etc.), a short-distance communication module (e.g., a Wi-Fi module), and a digital broadcast module (e.g., a Digital Multimedia Broadcasting (DMB) module). In an exemplary implementation, the RF unit 350 may download the program 341 for improving touch sensitivity, from an application store or the like, under the control of the control unit 370. The control unit 370 may install the downloaded program 341 in the memory unit 340.

The audio processing unit 360 sends to the speaker an audio signal received from the control unit 370 and also sends to the control unit 370 an audio signal such as voice received from the microphone. That is, under the control of the control unit 370, the audio processing unit 360 may convert voice/sound data into audible tones through the speaker and also convert audio signals received from the microphone into digital signals.

The control unit 370 controls operations of the mobile device and signal flows between elements of the mobile device, and processes data. Also, the control unit 370 may control power supply from a battery to the elements. Additionally, the control unit 370 may execute various kinds of applications stored in the program region. The control unit 370, as shown in FIGS. 4 and 5, may include a touch sensing unit for sensing the occurrence of a touch event.

Figure 4:
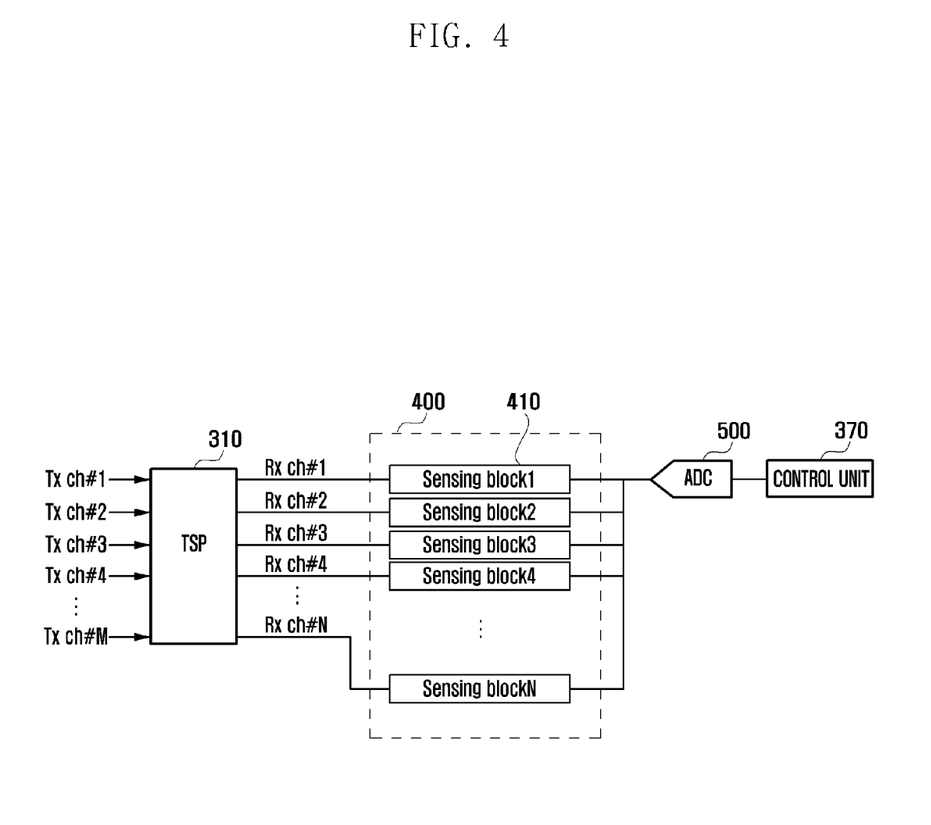
FIGS. 4 and 5 are views illustrating a touch sensing unit according to an exemplary embodiment of the present invention.
Figure 5:
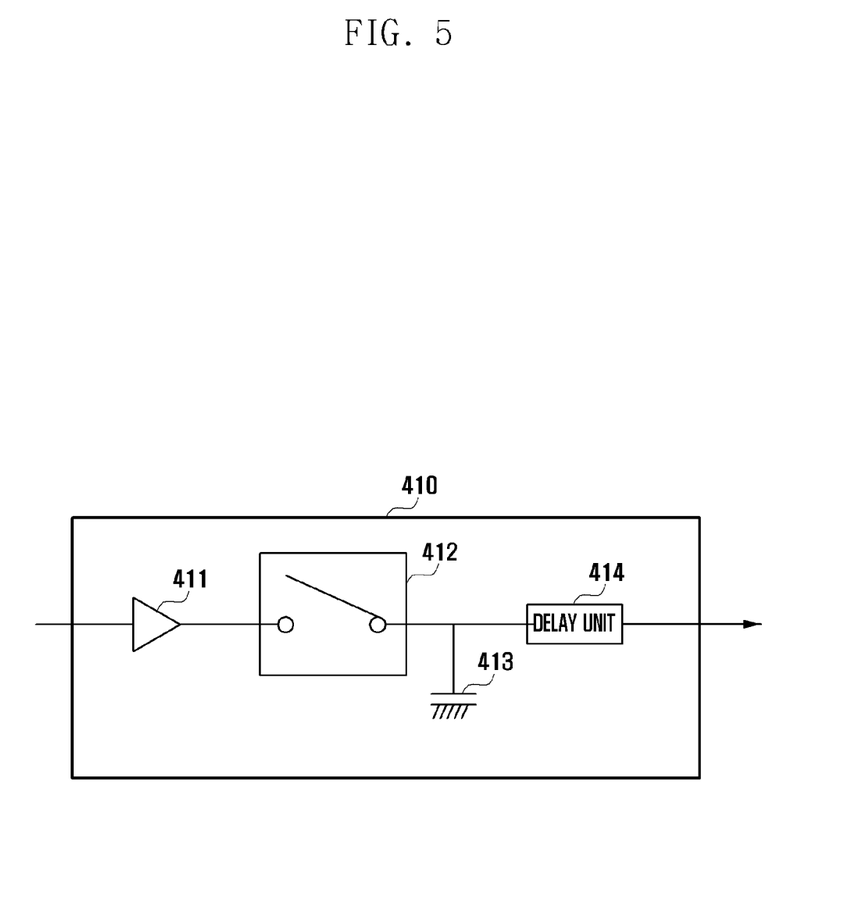

FIGS. 4 and 5 are views illustrating a touch sensing unit according to an exemplary embodiment of the present invention.

Referring to FIGS. 4 and 5, a touch sensing unit 400 may be disposed in the control unit 370 or between the touch screen panel 310 and the control unit 370. Similarly, an Analog-to-Digital Conversion (ADC) unit 500 may be disposed in the control unit 370 or between the touch sensing unit 400 and the control unit 370. The following descriptions will be given on the assumption that the touch sensing unit 400 and the ADC 500 are disposed between the touch screen panel 310 and the control unit 370.

The touch sensing unit 400 senses a variation of capacitance in the touch screen panel 310, that is, senses the occurrence of a touch event and outputs the sensed touch event to the ADC 500. As shown, this touch sensing unit 400 may be composed of "N" number of sensing blocks 410. In this case, "N" represents a numeral corresponding to the number of receiving channels (Rx Ch). Namely, the touch sensing unit 400 senses the occurrence of a touch event for each receiving channel. Each of the sensing blocks 410 may have an amplifier 411, a switch 412, a capacitor 413, and a delay unit 414, as shown in FIG. 5. The amplifier 411 amplifies a received signal inputted from the receiving channel of the touch screen panel 310. The switch 412 switches a connection between the amplifier 411 and the capacitor 413. This switching is controlled by the control unit 370. The capacitor 413 stores a capacitance of a received signal inputted from the receiving channel. The delay unit 414 delays the capacitance stored in the capacitor 413 for a predetermined delay time and outputs the stored capacitance to the ADC 500. The delay time is synchronized with the on/off period of the switch 412. If the switch 412 is in the off-state, the capacitance stored in the capacitor 413 is outputted to the ADC 500. On the other hand, if the switch 412 is in the on-state, the capacitance of the received signal inputted from the receiving channel is stored in the capacitor 413. Meanwhile, the ADC 500 converts the touch event (i.e., an analog signal) inputted from the touch sensing unit 400 into a digital signal and outputs it to the control unit 370. In other words, the touch sensing unit 400 respectively converts "N" capacitances inputted from "N" sensing blocks 410 into digital data and outputs them to the control unit 370.

In addition, the control unit 370 sequentially outputs a transmitting signal to "M" number of transmitting channels Tx. In an exemplary implementation, the transmitting signal is a square wave. The frequency of the square wave is defined as a scan frequency. Namely, the control unit 370 sequentially outputs the square wave from the first to the M-th transmitting channels according to the defined scan frequency. Also, the control unit 370 controls all "N" number of switches 412 to be in the on-state when the output square wave is a plus wave form (i.e., above a threshold). On the contrary, the control unit 370 controls all "N" number of switches 412 to be in the off-state when the output square wave is a minus wave form (i.e., below a threshold). Additionally, the control unit 370 senses a voltage value with respect to the first to the N-th digital data inputted from the ADC 500 and determines whether each voltage value exceeds a predetermined threshold value. And, if the voltage value exceeds the threshold value, the control unit 370 recognizes that a corresponding receiving channel is touched. That is, the control unit 370 drives the first to the M-th transmitting channels (Tx) one by one. At each time, the control unit 370 simultaneously scans "N" number of receiving channels to obtain the voltage value. After obtaining the voltage value for all sensing nodes of the touch screen panel 310, the control unit 370 compares each voltage value with the threshold value. Based on comparison results, the control unit 370 recognizes the touched sensing node, namely, touch coordinates x and y. Here, x and y may be defined as the numeral of the transmitting channel and the numeral of the receiving channel, respectively, or vice versa. Meanwhile, the control unit 370 may perform a method for improving touch sensitivity as shown in FIG. 6.

Figure 6:
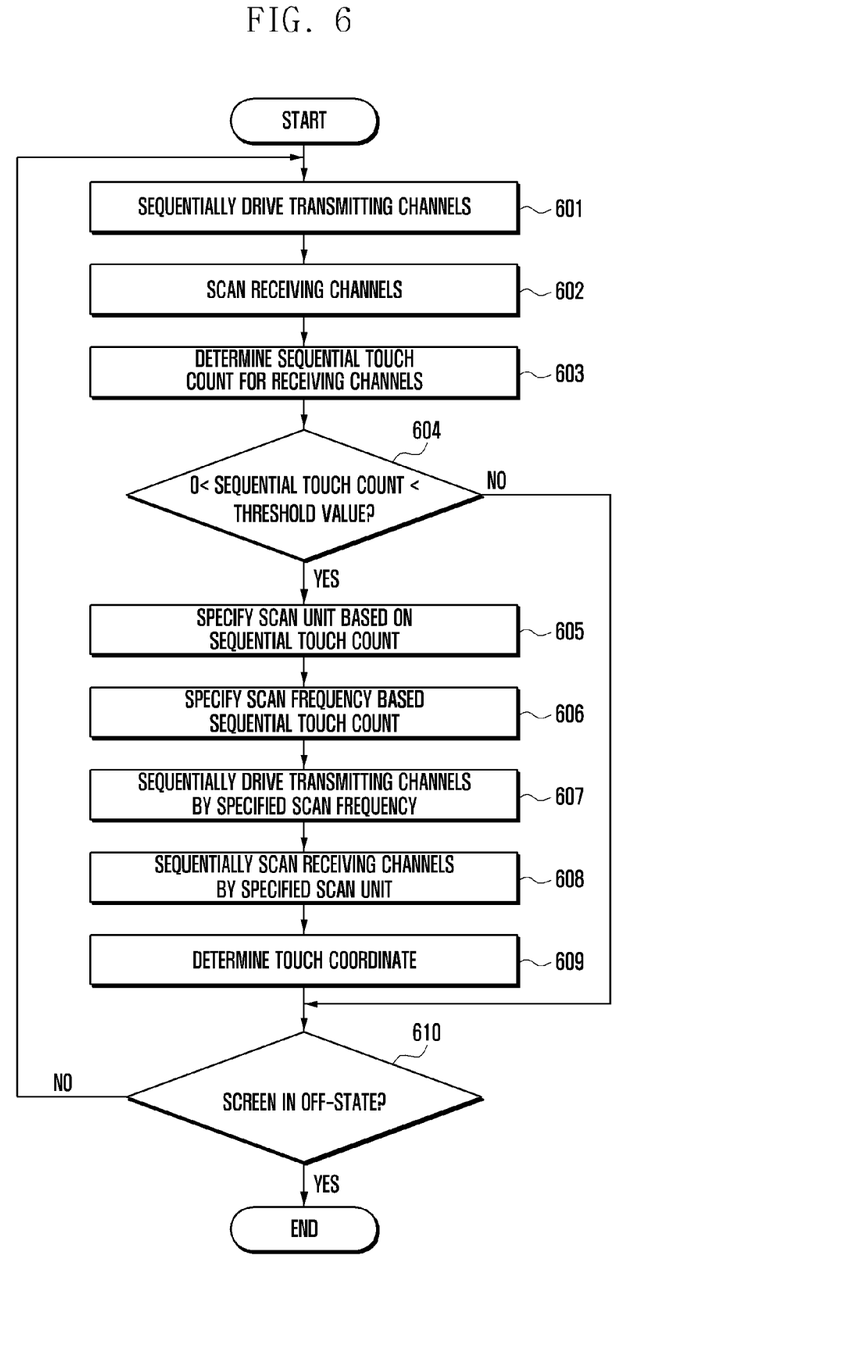
FIG. 6 is a flowchart illustrating a method for improving touch sensitivity according to an exemplary embodiment of the present invention.

FIG. 6 is a flowchart illustrating a method for improving touch sensitivity according to an exemplary embodiment of the present invention.

Referring to FIG. 6, under the condition that a screen is in the on-state, the control unit 370 sequentially drives the first to the M-th transmitting channels (Tx) with the predetermined scan frequency in step S601. At the same time, the control unit 370 scans "N" number of receiving channels in step S602. When all sensing nodes formed on the touch screen panel 310 are scanned completely, the control unit 370 determines the number of touched receiving channels in step 603. The control unit 370 determines whether a sequential touch count is lower than the threshold value in step S604. The sequential touch count is defined as the number of sequentially touched receiving channels. For instance, if receiving channels #1, #2, #3, and #5 are touched, the sequential touch count becomes three because #5 is excluded. Meanwhile, the threshold value is used for defining a finger touch. If the sequential touch count exceeds the threshold value, the control unit 370 considers this touch as a non-finger touch (e.g., a palm touch or a cheek touch) and ignores it.

If the sequential touch count is one or more and does not exceed the threshold value, the control unit 370 performs step S605. In step S605, the control unit 370 specifies a scan unit on the basis of the sequential touch count. The specified scan unit is defined as a value for classifying "N" number of receiving channels corresponding to the sequential touch count. In step S606, the control unit 370 may specify a scan frequency on the basis of the sequential touch count.

In step S607, the control unit 370 sequentially drives the first to the M-th transmitting channels (Tx) with the scan frequency newly specified in step S606. At each time, the control unit 370 sequentially scans "N" number of receiving channels by using the specified scan unit and obtains the voltage values of all sensing nodes formed on the touch screen panel 310 in step S608. In step S609, the control unit 370 compares each of the obtained voltage values with the threshold value, and, based on the comparison results, the control unit 370 determines the touched sensing node, namely, the touch coordinates x and y. The control unit 370 determines whether the screen is in the off-state in step S610. If the key signal for turning off the screen is inputted from the key input unit 320 in step S610, the control unit 370 stops driving the touch screen panel 310. On the other hand, if the screen is still in the on-state in step S610, the control unit 370 returns to step S601.

Hereinafter, a method and apparatus for improving touch sensitivity in accordance with exemplary embodiments of the present invention will be described in more detail.

Figure 7:
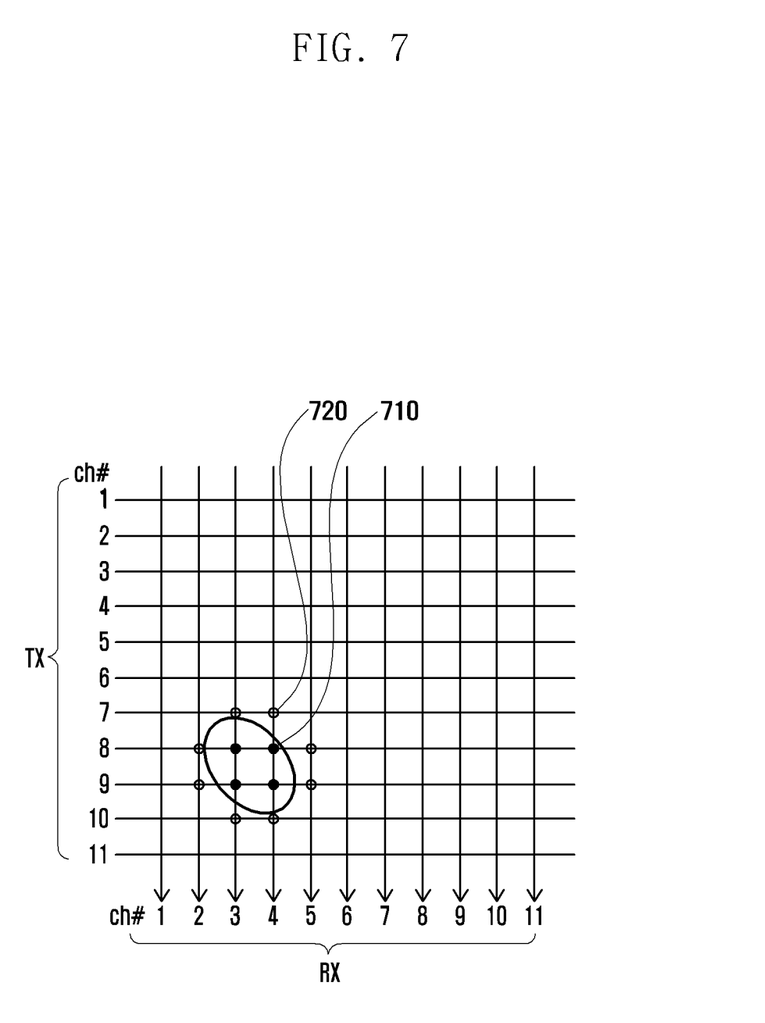
FIGS. 7 to 9 are views illustrating an arrangement of transmitting channels and receiving channels of a touch screen panel according to an exemplary embodiment of the present invention.
Figure 8:
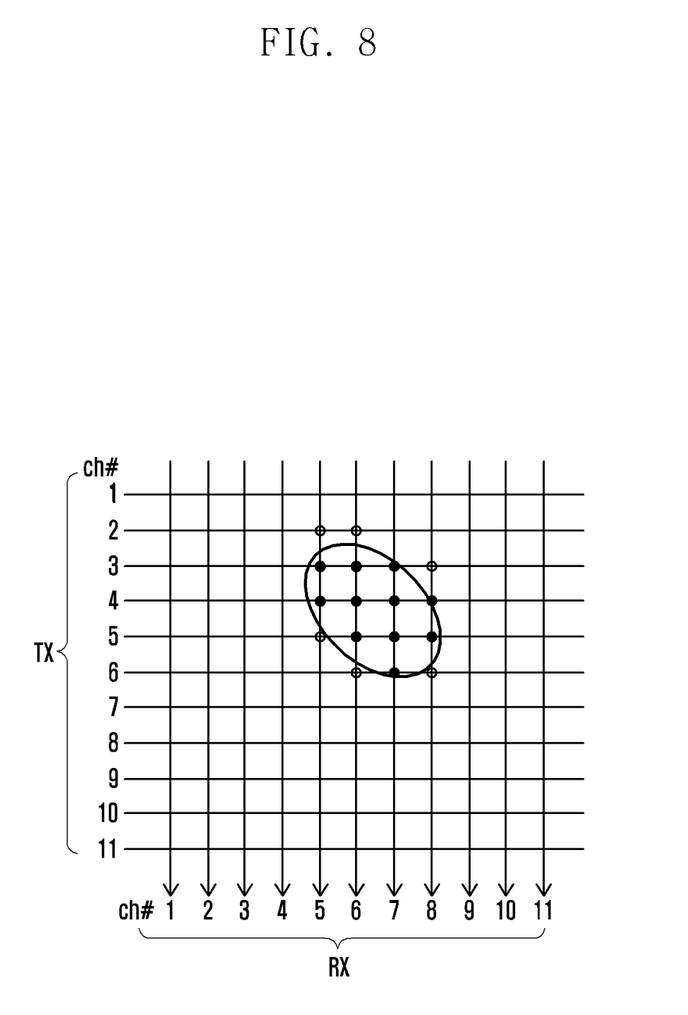
Figure 9:
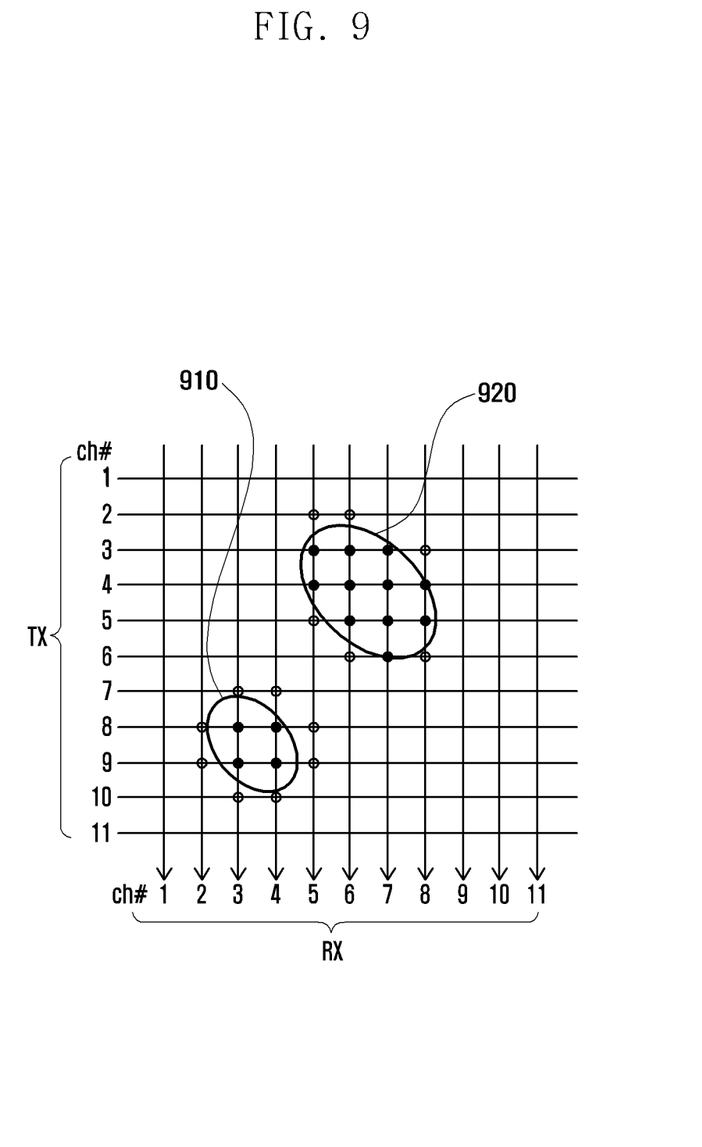

FIGS. 7 to 9 are views illustrating an arrangement of transmitting channels and receiving channels of a touch screen panel according to an exemplary embodiment of the present invention. The following descriptions will be given on the assumption that the number of transmitting channels and the number of receiving channels are eleven, respectively, and that the threshold value for defining a finger touch is determined in advance as five.

Referring to FIG. 7 under the above assumption, the control unit 370 determines the sequential touch count by performing the above-discussed steps S601 to S603. If the sequential touch count is two (receiving channels #3 and #4), the control unit 370 recognizes that a finger touch occurs. After that, the control unit 370 specifies a scan unit as 2. The control unit 370 categorizes eleven numbers of receiving channels into two groups, based on the specified scan unit. When the receiving channels are categorized into two groups, any adjacent receiving channels are not included in the same group. That is, a first group has receiving channels #1, #3, #5, #7, #9 and #11, and a second group has receiving channels #2, #4, #6, #8 and #10. Also, the control unit 370 specifies the scan frequency at double. The control unit 370 sequentially drives the first to the eleventh transmitting channels, using the double scan frequency. Whenever driving one transmitting channel, the control unit 370 sequentially scans the receiving channels, using the specified scan unit. That is, the control unit 370 scans simultaneously a first category and then scans a second category. Of course, the scan order may be inversed. The control unit 370 scans all sensing nodes in this scan manner and thereby determines touch coordinates.

In FIG. 7, reference numeral 710 represents a sensing node touched by a finger, and reference numeral 720 represents a sensing node over which a finger hovers. Both a first threshold value for proximity sensing and a second threshold value for touch sensing may be specified. The second threshold value is greater than the first threshold value. If the voltage value of the sensing node exceeds the first threshold value and is under the second threshold value, the control unit 370 may recognize that a finger is in the proximity of the sensing node. If the voltage value of the sensing node exceeds the second threshold, the control unit 370 may recognize that the sensing node is touched. For this reason, the control unit 370 may consider any receiving channel close to a finger when determining the sequential touch count.

Referring to FIG. 8, if the sequential touch count is four (receiving channels #5 to #8), the control unit 370 recognizes that a finger touch occurs since four is under the threshold value. Thus, the control unit 370 specifies a scan unit as 4 and categorizes eleven numbers of receiving channels into four groups. As discussed above, any adjacent receiving channels are not included in the same group. That is, a first group has receiving channels #1, #5 and #9, a second group has receiving channels #2, #6 and #10, a third group has receiving channels #3, #7 and #11, and a fourth group has receiving channels #4 and #8. Also, the control unit 370 specifies the scan frequency at quadruple. The control unit 370 sequentially drives the first to the eleventh transmitting channels, using the quadruple scan frequency. Whenever driving one transmitting channel, the control unit 370 sequentially scans the receiving channels from a first category to a fourth category, using the specified scan unit. The control unit 370 scans all sensing nodes in this scan manner and thereby determines touch coordinates.

Referring to FIG. 9, this is a case of a multi-touch. Namely, an assumption is made in FIG. 9 that a touch happens at several points on the touch screen panel 310. In this multi-touch case, the control unit 370 defines a relatively greater touch region as a region for specifying a scan unit and a scan frequency. As shown, the control unit 370 selects a second touch region 920 greater than a first touch region 910 and determines a sequential touch count in the selected touch region 920. The subsequent process is substantially the same as previously discussed with reference to FIG. 8.

The above-discussed mobile device may essentially or selectively include any other elements. For instance, the mobile device may further include a short range communication module, a digital camera module, a wired or wireless data transmission interface, an Internet access module, a digital broadcast receiving module, and so forth. According to a digital convergence tendency, such elements may be varied, modified and improved in various ways, and any other elements equivalent to the above elements may be additionally or alternatively equipped in the portable device. Meanwhile, as will be understood by those skilled in the art, some of the above-mentioned elements in the mobile device may be omitted or replaced with another.

The present invention is described herein with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Furthermore, each block of the flowchart illustrations may represent a module, segment, or portion of code, which comprises one or more executable instructions for implementing the specified logical function(s). It should also be noted that, in some alternative implementations, the functions noted in the blocks may occur out of order. For example, two blocks shown in succession may in fact be executed substantially concurrently or the blocks may sometimes be executed in the reverse order, depending upon the functionality involved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for improving touch sensitivity in an electronic device having a capacitive type touch screen panel, the method comprising:
    sequentially driving a plurality of transmitting channels of the touch screen panel using a predetermined scan frequency;
    determining a number of adjacently touched receiving channels of a plurality of receiving channels by simultaneously scanning a plurality of receiving channels of the touch screen panel;
    specifying a scan unit to be used for dividing the plurality of receiving channels into groups on the basis of the number of adjacently touched receiving channels and for sequentially scanning the groups of the receiving channels;
    determining a touch coordinate by sequentially scanning the plurality of receiving channels using the specified scan unit;
    newly specifying the predetermined scan frequency based on the number of adjacently touched receiving channels; and
    sequentially driving the plurality of transmitting channels using the newly specified scan frequency,
    wherein the newly specifying of the scan frequency includes multiplying the predetermined scan frequency by the number of adjacently touched receiving channels.

2. The method of claim 1, wherein the specifying of the scan unit includes categorizing the plurality of receiving channels in an amount corresponding to the number of adjacently touched receiving channels.

3. The method of claim 2, wherein the categorizing of the plurality of receiving channels includes categorizing adjacent receiving channels into different groups.

4. The method of claim 1, wherein the determining of the number of adjacently touched receiving channels includes:
    when a multi-touch is detected from two or more regions on the touch screen panel, selecting a greatest region in area among the regions; and
    determining the number of adjacently touched receiving channels at the selected region.

5. The method of claim 1, wherein the specifying of the scan unit includes specifying the scan unit on the basis of the number of adjacently touched receiving channels when the number of adjacently touched receiving channels is lower than a predetermined threshold value.

6. The method of claim 5, wherein the threshold value is used to determine whether the adjacently arranged receiving channels being touched are touched by a finger.

7. An apparatus for improving touch sensitivity, the apparatus comprising:
    a capacitive type touch screen panel having a plurality of transmitting and receiving channels; and
    a control unit configured to:
        sequentially drive the plurality of transmitting channels using a predetermined scan frequency,
        determine a number of adjacently touched receiving channels by simultaneously scanning the plurality of receiving channels wherein the number of adjacently touched receiving channels is the number of adjacently arranged receiving channels being touched,
        specify a scan unit on the basis of the number of adjacently touched receiving channels,
        determine a touch coordinate by sequentially scanning the plurality of receiving channels using the specified scan unit,
        newly specify the scan frequency based on the number of adjacently touched receiving channels, and
        sequentially drive the plurality of transmitting channels using the newly specified scan frequency,
    wherein the newly specified scan frequency is a scan frequency multiplied by the number of adjacently touched receiving channels.

8. The apparatus of claim 7, wherein the control unit is further configured to:
    categorize the plurality of receiving channels into groups in an amount corresponding to the number of adjacently touched receiving channels, and
    determine the touch coordinate by sequentially scanning the groups of the receiving channels.

9. The apparatus of claim 8, wherein adjacent receiving channels are categorized into different groups.

10. The apparatus of claim 7, wherein the control unit is further configured to:
    when a multi-touch is detected from two or more regions on the touch screen panel, select a greatest region in area among the regions, and
    determine the number of adjacently touched receiving channels at the selected region.

11. The apparatus of claim 7, wherein the control unit is further configured to:
    when the number of adjacently touched receiving channels is lower than a predetermined threshold value, determine that the adjacently arranged receiving channels being touched are touched by a finger, and
    determine the touch coordinate.

12. The apparatus of claim 7, further comprising a touch sensing unit configured to detect a variation in capacitance in the touch screen panel.

13. The apparatus of claim 12, wherein the touch sensing unit comprises a plurality of sensing blocks corresponding to the plurality of receiving channels.

14. The apparatus of claim 13, wherein each of the plurality of sensing blocks comprises:
- an amplifier configured to receive and amplify a signal from a corresponding receiving channel;
- a capacitor configured to receive and store a capacitance from the corresponding receiving channel;
- a switch, controlled by the control unit, configured to switch a connection between the amplifier and the capacitor; and
- a delay unit configured to delay an output of the capacitor.

15. The apparatus of claim 14, further comprising an Analog to Digital Conversion (ADC) unit configured to receive the delayed output from the delay unit and to output a digital signal to the control unit.

* * * * *